United States Patent
Zhang

(10) Patent No.: US 10,572,693 B2
(45) Date of Patent: Feb. 25, 2020

(54) METHOD FOR HIDING PERSONAL INFORMATION ON CALL SCREEN, AND DEVICE

(71) Applicant: Huawei Technologies Co., Ltd., Shenzhen (CN)

(72) Inventor: Yajun Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 281 days.

(21) Appl. No.: 15/549,048

(22) PCT Filed: Feb. 4, 2015

(86) PCT No.: PCT/CN2015/072208
§ 371 (c)(1),
(2) Date: Aug. 4, 2017

(87) PCT Pub. No.: WO2016/123758
PCT Pub. Date: Aug. 11, 2016

(65) Prior Publication Data
US 2018/0039796 A1 Feb. 8, 2018

(51) Int. Cl.
*G06F 21/62* (2013.01)
*G06F 21/84* (2013.01)
(Continued)

(52) U.S. Cl.
CPC .......... *G06F 21/84* (2013.01); *G06F 3/0488* (2013.01); *G06F 21/32* (2013.01); *G06F 21/50* (2013.01);
(Continued)

(58) Field of Classification Search
CPC ...... G06F 21/60; G06F 21/6245; G06F 21/50; G06F 21/54; G06F 21/84; G06F 21/32; G06F 3/0488; H04W 12/02
See application file for complete search history.

(56) References Cited

U.S. PATENT DOCUMENTS

| | | | |
|---|---|---|---|
| 2005/0177373 A1* | 8/2005 | Cooper | G06F 9/453 704/275 |
| 2008/0229230 A1* | 9/2008 | Grigoriev | G06F 21/82 715/780 |

(Continued)

FOREIGN PATENT DOCUMENTS

| | | |
|---|---|---|
| CN | 101778154 A | 7/2010 |
| CN | 101958966 A | 1/2011 |

(Continued)

OTHER PUBLICATIONS

Machine Translation and Abstract of Chinese Publication No. CN104077520, Oct. 1, 2014, 30 pages.
(Continued)

*Primary Examiner* — Alexander Lagor
*Assistant Examiner* — Vu V Tran
(74) *Attorney, Agent, or Firm* — Conley Rose, P.C.

(57) ABSTRACT

A method includes obtaining by detection by a device, characters entered by a user after establishing a call to another device, and when determining that a display mode of a call screen is indirect display, replacing the obtained characters with preset characters and displaying the preset characters in an input display area.

20 Claims, 9 Drawing Sheets

(51) Int. Cl.
*H04W 12/02* (2009.01)
*G06F 21/50* (2013.01)
*G06F 21/60* (2013.01)
*G06F 3/0488* (2013.01)
*G06F 21/32* (2013.01)
*G06F 21/54* (2013.01)

(52) U.S. Cl.
CPC .............. *G06F 21/54* (2013.01); *G06F 21/60* (2013.01); *G06F 21/6245* (2013.01); *H04W 12/02* (2013.01)

(56) References Cited

U.S. PATENT DOCUMENTS

| | | | |
|---|---|---|---|
| 2010/0165199 A1* | 7/2010 | Lee ..................... | H04N 5/4403 348/563 |
| 2010/0240980 A1 | 9/2010 | Zhu et al. | |
| 2012/0165075 A1 | 6/2012 | Kim et al. | |
| 2013/0111597 A1* | 5/2013 | Gossweiler, III ..... | G06F 21/556 726/26 |
| 2014/0134979 A1 | 5/2014 | Sen et al. | |
| 2014/0146054 A1* | 5/2014 | Luan ....................... | G06F 21/31 345/467 |
| 2014/0378099 A1 | 12/2014 | Huang et al. | |
| 2016/0062975 A1* | 3/2016 | Yamahara ............... | G06F 21/31 715/224 |

FOREIGN PATENT DOCUMENTS

| | | |
|---|---|---|
| CN | 103345607 A | 10/2013 |
| CN | 104023320 A | 9/2014 |
| CN | 104077520 A | 10/2014 |
| CN | 104091128 A | 10/2014 |
| CN | 104468959 A | 3/2015 |

OTHER PUBLICATIONS

Machine Translation and Abstract of Chinese Publication No. CN104091128, Oct. 8, 2014, 16 pages.
Foreign Communication From a Counterpart Application, European Application No. 15880714.9, Extended European Search Report dated Oct. 13, 2017, 8 pages.
Foreign Communication From a Counterpart Application, PCT Application No. PCT/CN2015/072208, English Translation of International Search Report dated Oct. 29, 2015, 2 pages.
Foreign Communication From a Counterpart Application, PCT Application No. PCT/CN2015/072208, English Translation of Written Opinion dated Oct. 29, 2015, 6 pages.
Machine Translation and Abstract of Chinese Publication No. CN101958966, Jan. 26, 2011, 10 pages.
Machine Translation and Abstract of Chinese Publication No. CN101958966, Mar. 25, 2015, 9 pages.
Foreign Communication From a Counterpart Application, Chinese Application No. 201580006722.0, Chinese Office Action dated May 10, 2018, 10 pages.
Machine Translation and Abstract of Chinese Publication No. CN101778154, Jul. 14, 2010, 14 pages.
Machine Translation and Abstract of Chinese Publication No. CN103345607, Oct. 9, 2013, 18 pages.
Machine Translation and Abstract of Chinese Publication No. CN104023320, Sep. 3, 2014, 20 pages.
Foreign Communication From a Counterpart Application, Chinese Application No. 201580006722.0, Chinese Office Action dated Jan. 14, 2019, 8 pages.

* cited by examiner

METHOD FOR HIDING PERSONAL INFORMATION ON CALL SCREEN, AND DEVICE

CROSS-REFERENCE TO RELATED APPLICATION

This application is a U.S. National Stage of International Patent Application No. PCT/CN2015/072208 filed Feb. 4, 2015, which is incorporated by reference herein in its entirety.

TECHNICAL FIELD

The present disclosure relates to the field of terminal application technologies, and in particular, to a method for hiding personal information on a call screen, and a device.

BACKGROUND

An interactive voice response (IVR) service is a query service provided by means of a voice call. An increasing quantity of large enterprises or agencies (such as banks) provide an IVR service to users.

When service types related to the IVR service have relatively high security requirements (such as bank transfer, bank password change, or stock exchange), in an interactive interaction process, a user often needs to provide corresponding personal information such as a password or an account. However, currently, when a device is used to dial an IVR service number for business handling, all the characters, including personal information, entered by a user are always displayed in a plaintext form on a call screen of the device. Therefore, when the IVR service is used in a public occasion, a severe information security risk exists.

SUMMARY

Embodiments of the present disclosure provide a method for hiding personal information on a call screen, and a device in order to resolve a problem of poor security that is caused by displaying personal information by a device in a plaintext form when an IVR service is used.

To achieve the foregoing objective, the following technical solutions are used in the embodiments of the present disclosure.

According to a first aspect, a method for hiding personal information on a call screen is provided, including obtaining, after establishing a call to another device, characters entered by a user, replacing the obtained characters with preset characters and displaying the preset characters in an input display area on the call screen if a display mode of the call screen is indirect display, and directly displaying the obtained characters in the input display area if the display mode is direct display.

With reference to the first aspect, in a first possible implementation manner, obtaining, after establishing a call to another device, characters entered by a user includes obtaining, by detecting a click operation of the user in an interaction area on the call screen, the characters entered by the user after establishing the call to the other device, or obtaining, by detecting voice input of the user, the characters entered by the user after establishing the call to the other device.

With reference to the first aspect or the first possible implementation manner of the first aspect, in a second possible implementation manner, further includes switching the display mode after detecting a click operation of the user on a preset identifier in the interaction area on the call screen.

With reference to the first aspect or the first possible implementation manner of the first aspect, in a third possible implementation manner, after establishing the call to the other device, the method further includes switching the display mode to the indirect display when detecting that the other device prompts the user to enter personal information if the display mode is the direct display.

With reference to the third possible implementation manner of the first aspect, in a fourth possible implementation manner, switching the display mode to the indirect display when detecting that the other device prompts the user to enter personal information includes receiving a voice prompt tone provided by the other device and performing voice recognition on the voice prompt tone, and switching the display mode to the indirect display when determining by recognition that the voice prompt tone includes a preset keyword.

With reference to the third possible implementation manner of the first aspect, in a fifth possible implementation manner, switching the display mode to the indirect display when detecting that the other device prompts the user to enter personal information includes recording a character sequence entered by the user and matching the character sequence and a preset menu directory, where the preset menu directory is a data table in which a correspondence between at least one character sequence and a service item is recorded, and switching the display mode to the indirect display when determining that a service item corresponding to the character sequence is an information service item, where the information service item is a service item in which personal information needs to be provided to the other device.

With reference to any one of the first aspect to the fifth possible implementation manner of the first aspect, in a sixth possible implementation manner, when the input display area is in an editable state, replacing the obtained characters with preset characters and displaying the preset characters in an input display area on the call screen includes replacing the obtained characters with the preset characters and displaying the preset characters in the input display area that is in an editable state, and sending a character string composed of the obtained characters to the other device after detecting an operation for sending.

With reference to any one of the first aspect to the sixth possible implementation manner of the first aspect, in a seventh possible implementation manner, after establishing the call to the other device, if the display mode is the indirect display, when detecting an operation for restoring, the method further includes restoring all the preset characters in the input display area to corresponding characters for display, and replacing the restored characters with the preset characters for display after an interval of preset duration.

According to a second aspect, a device is provided, including an obtaining unit configured to obtain, after the device establishes a call to another device, characters entered by a user, a first display unit configured to replace the obtained characters with preset characters and display the preset characters in an input display area on the call screen if a display mode of the call screen is indirect display, and a second display unit configured to directly display the obtained characters in the input display area if the display mode is direct display.

With reference to the second aspect, in a first possible implementation manner, the obtaining unit includes a first detection unit or a second detection unit, where the first detection unit is configured to obtain, by detecting a click operation of the user in an interaction area on the call screen, the characters entered by the user after the device establishes the call to the other device, and the second detection unit is configured to obtain, by detecting voice input of the user, the characters entered by the user after the device establishes the call to the other device.

With reference to the second aspect or the first possible implementation manner of the second aspect, in a second possible implementation manner, further includes a first switching unit configured to switch the display mode after detecting a click operation of the user on a preset identifier in the interaction area on the call screen.

With reference to the second aspect or the first possible implementation manner of the second aspect, in a third possible implementation manner, further includes a second switching unit configured to switch the display mode to the indirect display when detecting that the other device prompts the user to enter personal information after the device establishes the call to the other device, if the display mode is the direct display.

With reference to the third possible implementation manner of the second aspect, in a fourth possible implementation manner, the second switching unit is further configured to receive a voice prompt tone provided by the other device and perform voice recognition on the voice prompt tone, and switch the display mode to the indirect display when determining by recognition that the voice prompt tone includes a preset keyword.

With reference to the third possible implementation manner of the second aspect, in a fifth possible implementation manner, the second switching unit is further configured to record a character sequence entered by the user and match the character sequence and a preset menu directory, where the preset menu directory is a data table in which a correspondence between at least one character sequence and a service item is recorded, and switch the display mode to the indirect display when determining that a service item corresponding to the character sequence is an information service item, where the information service item is a service item in which personal information needs to be provided to the other device.

With reference to any one of the second aspect to the fifth possible implementation manner of the second aspect, in a sixth possible implementation manner, when the input display area is in an editable state, the first display unit is further configured to replace the obtained characters with the preset characters and display the preset characters in the input display area that is in an editable state, and send a character string composed of the obtained characters to the other device after detecting an operation for sending.

With reference to any one of the second aspect to the sixth possible implementation manner of the second aspect, in a seventh possible implementation manner, further includes a processing unit configured to restore all the preset characters in the input display area to corresponding characters for display after the device establishes the call to the other device, if the display mode is the indirect display, when detecting an operation for restoring, and replace the restored characters with the preset characters for display after an interval of preset duration.

According to a third aspect, a portable electronic device is provided, including a display, where the display includes a touch-sensitive surface and a display screen, one or more processors, a memory, and one or more programs, where the one or more programs are stored in the memory and are configured to be executed by the one or more processors, and the one or more programs include an instruction, where the instruction is used to obtain, after the portable electronic device establishes a call to another device, characters entered by a user, replace the obtained characters with preset characters and display the preset characters in an input display area on the call screen if a display mode of the call screen is indirect display, and directly display the obtained characters in the input display area if the display mode is direct display.

With reference to the third aspect, in a first possible implementation manner, where obtaining, after the portable electronic device establishes a call to another device, characters entered by a user includes obtaining, by detecting a click operation of the user in an interaction area on the call screen, the characters entered by the user after the portable electronic device establishes the call to the other device, or obtaining, by detecting voice input of the user, the characters entered by the user after the portable electronic device establishes the call to the other device.

With reference to the third aspect or the first possible implementation manner of the third aspect, in a second possible implementation manner, the instruction is further used to switch the display mode after detecting a click operation of the user on a preset identifier in the interaction area on the call screen.

With reference to the third aspect or the first possible implementation manner of the third aspect, in a third possible implementation manner, the instruction is further used to switch the display mode to the indirect display when detecting that the other device prompts the user to enter personal information after the portable electronic device establishes the call to the other device, if the display mode is the direct display.

With reference to the third possible implementation manner of the third aspect, in a fourth possible implementation manner, switching the display mode to the indirect display when detecting that the other device prompts the user to enter personal information includes receiving a voice prompt tone provided by the other device and performing voice recognition on the voice prompt tone, and switching the display mode to the indirect display when determining by recognition that the voice prompt tone includes a preset keyword.

With reference to the third possible implementation manner of the third aspect, in a fifth possible implementation manner, switching the display mode to the indirect display when detecting that the other device prompts the user to enter personal information includes recording a character sequence entered by the user and matching the character sequence and a preset menu directory, where the preset menu directory is a data table in which a correspondence between at least one character sequence and a service item is recorded, and switching the display mode to the indirect display when determining that a service item corresponding to the character sequence is an information service item, where the information service item is a service item in which personal information needs to be provided to the other device.

With reference to any one of the third aspect to the fifth possible implementation manner of the third aspect, in a sixth possible implementation manner, the instruction is further used to replace the obtained characters with the preset characters and display the preset characters in the input display area that is in an editable state when the input display area is in an editable state, and send a character string composed of the obtained characters to the other device after detecting an operation for sending.

With reference to any one of the third aspect to the sixth possible implementation manner of the third aspect, in a seventh possible implementation manner, the instruction is further used to restore all the preset characters in the input display area to corresponding characters for display after the portable electronic device establishes the call to the other device, if the display mode is the indirect display, when detecting an operation for restoring, and replace the restored characters with the preset characters for display after an interval of preset duration.

According to a fourth aspect, a portable electronic device is provided, including a display, where the display includes a touch-sensitive surface and a display screen, one or more processors, a memory, multiple application programs, and one or more programs, where the one or more programs are stored in the memory and are configured to be executed by the one or more processors, and the one or more programs include an instruction for performing the method in any one of the first aspect to the seventh possible implementation manner of the first aspect.

According to a fifth aspect, a computer readable storage medium storing one or more programs is provided, where the one or more programs include an instruction, and when being executed by a portable electronic device including a display and including multiple application programs, the instruction enables the portable electronic device to perform the method in any one of the first aspect to the seventh possible implementation manner of the first aspect, where the display includes a touch-sensitive surface and a display screen.

According to a sixth aspect, a graphical user interface on a portable electronic device is provided, where the portable electronic device includes a display, a memory, multiple application programs, and one or more processors configured to execute one or more programs stored in the memory, and the graphical user interface includes a user interface displayed in the method in any one of the first aspect to the seventh possible implementation manner of the first aspect, where the display includes a touch-sensitive surface and a display screen.

According to a seventh aspect, a portable electronic device is provided, including a display, where the display includes a touch-sensitive surface and a display screen, multiple application programs, and an apparatus configured to perform the method in any one of the first aspect to the seventh possible implementation manner of the first aspect.

According to an eighth aspect, an information processing apparatus used in a portable electronic device is provided, where the portable electronic device includes a display and multiple application programs, and the information processing apparatus includes an apparatus configured to perform the method in any one of the first aspect to the seventh possible implementation manner of the first aspect, where the display includes a touch-sensitive surface and a display screen.

It can be seen that, the embodiments of the present disclosure provide a method for hiding personal information on a call screen, and a device. After a call is established to another device, characters entered by a user are obtained by detection, and further, when a display mode of a call screen is indirect display, the obtained characters are replaced with preset characters and the preset characters are displayed in an input display area. In this way, when the user enters personal information, the entered information on the call screen is hidden by replacement in order to avoid problems of a high security risk of an IVR service and poor user experience that are caused using plaintext to display information. Therefore, the present disclosure can optimize security of the IVR service and improve availability of the IVR service.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
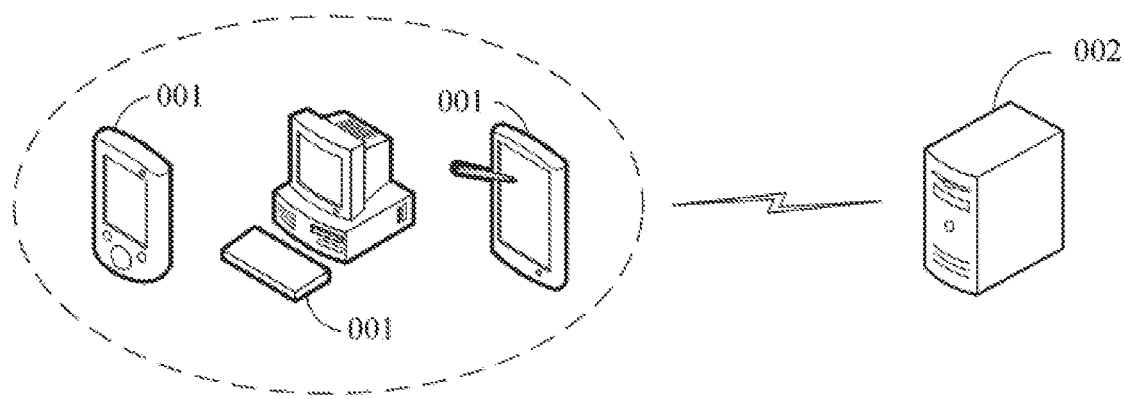
FIG. 1 is a schematic structural diagram of an IVR service system according to an embodiment of the present disclosure.

FIG. 1 is a schematic structural diagram of an IVR service system according to an embodiment of the present disclosure. The system is configured to implement a method for hiding personal information on a call screen provided in this embodiment of the present disclosure. Referring to FIG. 1, the service system includes a device 001 and a server 002.

The device 001 may be a portable mobile device such as a smartphone or a tablet computer with a voice call function, or may be a desktop terminal such as a personal computer, a notebook computer, or a tablet computer without a voice call function (implementing a voice call using an Internet phone such as SKYPE), and is configured to provide a voice call function to a user. Moreover, when the user dials a specified IVR service number to enter a corresponding IVR service system, the device 001 may interact with the server 002 according to an operation executed by the user in accordance with a system prompt such that the user automatically handles some services.

The server 002 may be a server of a call center system established by a corresponding enterprise or agency (such as a bank, a telecom operator, or a government office), or a server of a system such as a smart switchboard information desk query system, and is configured to automatically answer a phone, play a prerecorded voice prompt tone, guide the user to sequentially enter numbers and select items to be queried for, and further provide a corresponding service according to a selection of the user when the user dials a corresponding IVR service number using the device 001 to establish a call.

The device 001 is in a communication connection to the server 002. The server 002 can respond and establish a call between the device 001 and the server 002 when the device 001 uses a corresponding IVR service number to dial.

Figure 2:
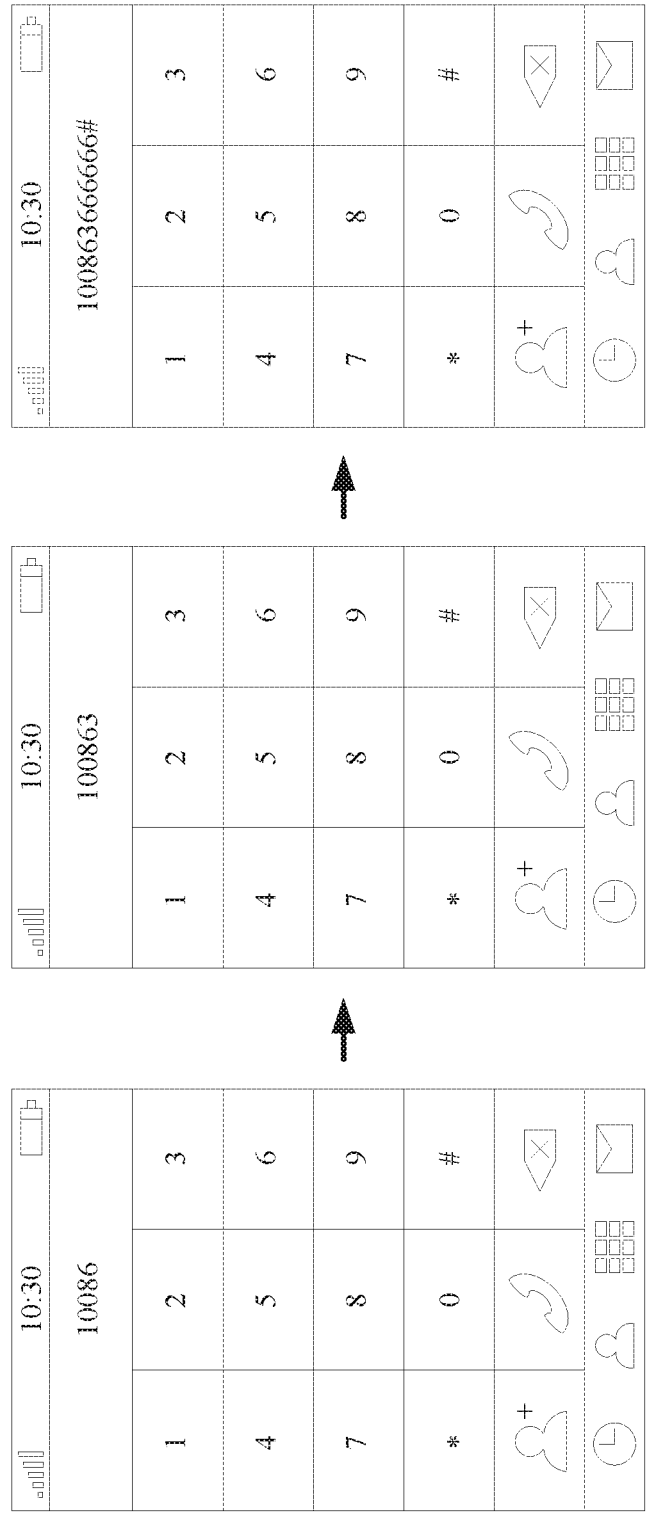
FIG. 2 is schematic effect diagram of a call screen using direct display according to an embodiment of the present disclosure.

FIG. 2 is schematic effect diagram of a call screen using direct display according to an embodiment of the present disclosure. In a normal state, a call screen of a device uses a display mode of direct display. In the display mode, all characters entered by a user in an interaction area (such as a dial pad) on the call screen are displayed in a plaintext form in an input display area. Using the following operation as an example, the user dials a called number "10086", further selects "3" according to a voice prompt, changes an account password, and further, enters a password "666666" according to the voice prompt, and ends with a pound key. Referring to FIG. 2, all the characters entered by the user in the operation process are displayed in a plaintext form on the call screen.

Figure 3:
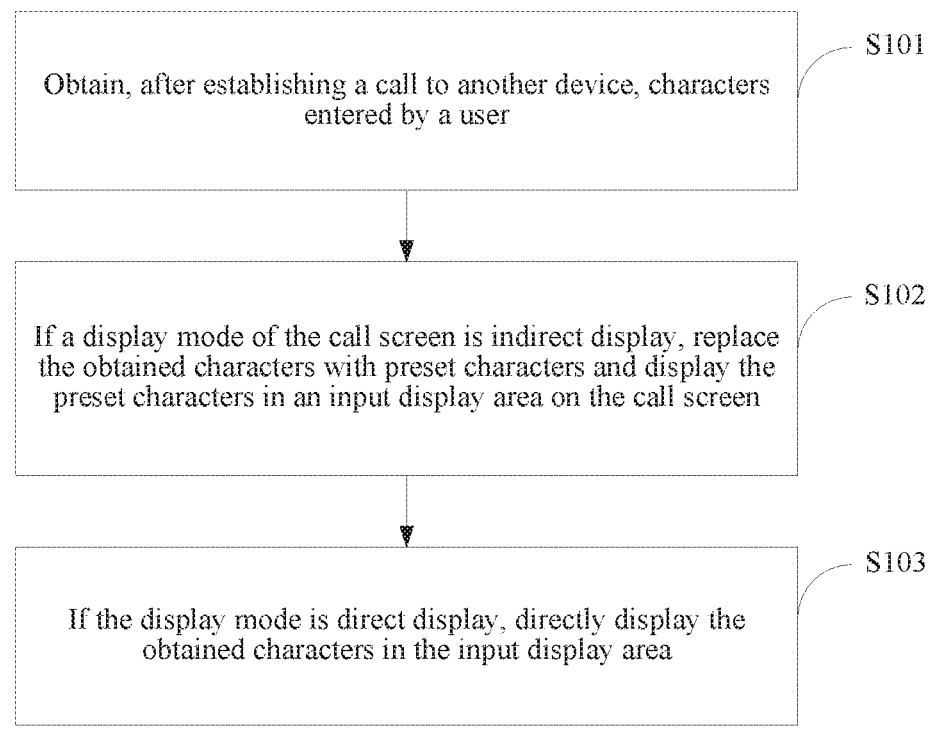
FIG. 3 is a schematic flowchart 1 of a method for hiding personal information on a call screen according to an embodiment of the present disclosure.

An embodiment of the present disclosure provides a method for hiding personal information on a call screen, and the method may be applied to the device 001 in the IVR service system shown in FIG. 1. As shown in FIG. 3, the method includes the following steps.

Step S101: Obtain, after establishing a call to another device, characters entered by a user.

In an implementation manner, after establishing a call to another device, the device obtains, by detecting a click operation of the user in an interaction area on the call screen, the characters entered by the user, or the device obtains, by detecting voice input of the user, the characters entered by the user after establishing a call to the other device.

In another implementation manner, the device switches a display mode after detecting a click operation of the user on a preset identifier in the interaction area on the call screen.

In another implementation manner, if the display mode is direct display, the device switches the display mode to indirect display when detecting that the other device prompts the user to enter personal information.

Further, the device may receive a voice prompt tone provided by the other device, perform voice recognition on the voice prompt tone, and further switch the display mode to the indirect display when determining by recognition that the voice prompt tone includes a preset keyword.

Alternatively, the device may record a character sequence entered by the user and match the character sequence and a preset menu directory, where the preset menu directory is a data table in which a correspondence between at least one character sequence and a service item is recorded, and further, the device may switch the display mode to the indirect display when determining that a service item corresponding to the character sequence is an information service item, where the information service item is a service item in which personal information needs to be provided to the other device.

Step S102: If a display mode of the call screen is indirect display, replace the obtained characters with preset characters and display the preset characters in an input display area on the call screen.

In an implementation manner, when the input display area is in an editable state, the device may replace the obtained characters with the preset characters and display the preset characters in the input display area that is in an editable state, and further send a character string composed of the obtained characters to the other device after detecting an operation for sending.

In another implementation manner, if the display mode is the indirect display, when detecting an operation for restoring, the device may restore all the preset characters in the input display area to corresponding characters for display, and replace the restored characters with the preset characters for display after an interval of preset duration.

Step S103: If the display mode is direct display, directly display the obtained characters in the input display area.

This embodiment of the present disclosure provides a method for hiding personal information on a call screen. After a call is established to another device, characters entered by a user are obtained by detection, and further, when a display mode of a call screen is indirect display, the obtained characters are replaced with preset characters and the preset characters are displayed in an input display area. In this way, when the user enters personal information, the entered information on the call screen is hidden by replacement in order to avoid a problem of a high security risk of an IVR service that is caused using plaintext to display information, optimize security of the IVR service, and improve availability of the IVR service.

Figure 4:
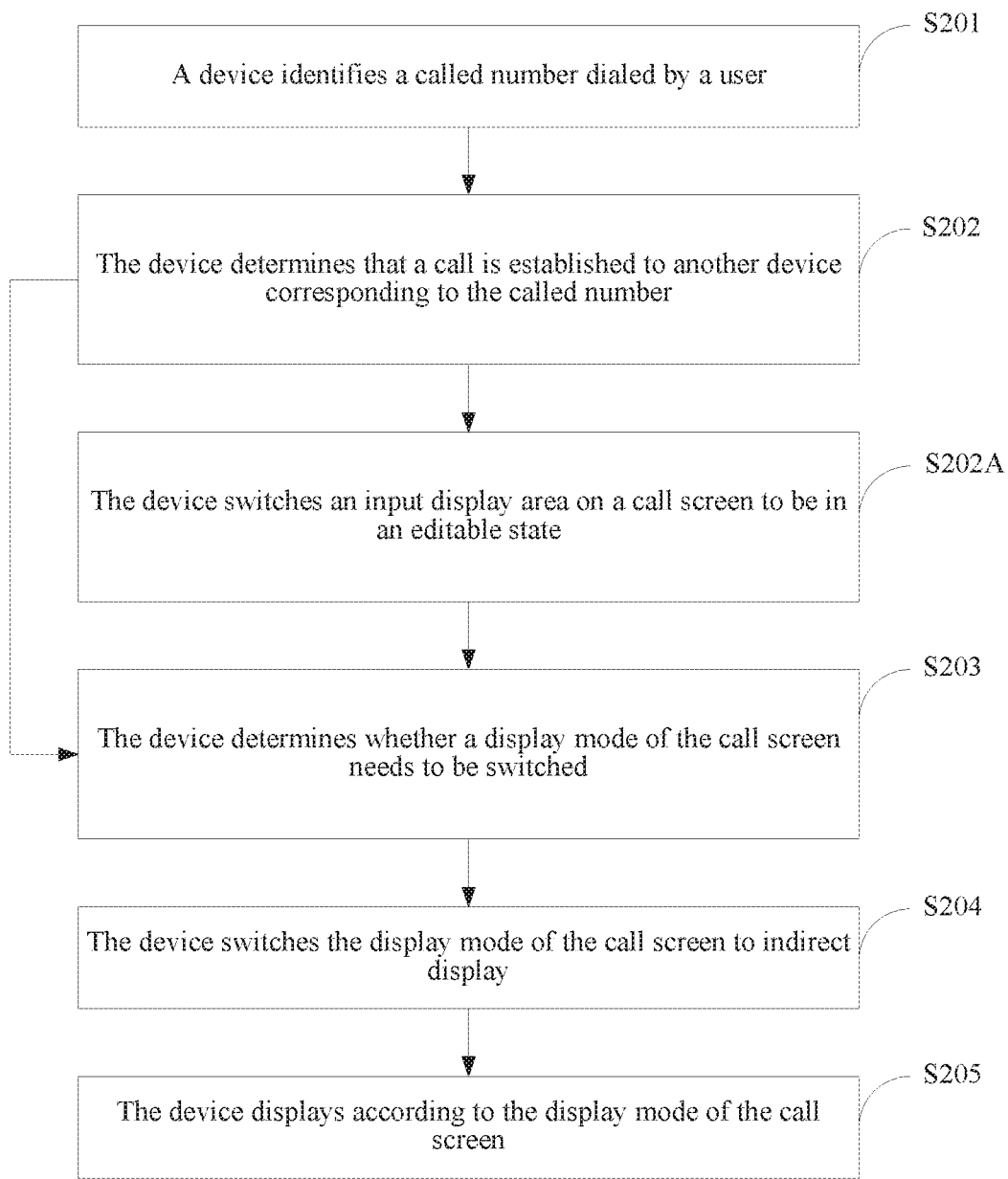
FIG. 4 is a schematic flowchart 2 of a method for hiding personal information on a call screen according to an embodiment of the present disclosure.

To enable a person skilled in the art to understand the technical solution provided by this embodiment of the present disclosure more clearly, based on the IVR service system shown in FIG. 1, the following describes in detail, using specific embodiments, another method for hiding personal information on a call screen provided by an embodiment of the present disclosure. The method may be applied to the device in the IVR service system shown in FIG. 1. As shown in FIG. 4, the method includes the following steps.

Step S201: A device identifies a called number dialed by a user.

Further, when the device detects a dial operation of the user and the user dials the called number using a dial pad on the call screen or in another manner, the device identifies, by matching the called number with a preset public number database, whether the called number is a preset IVR service number, and performs subsequent steps and operations after determining that the called number is a preset IVR service number in order to hide display of personal information entered by the user on the call screen.

The foregoing preset public number database may be a database pre-stored in the device or in cloud-end storage space of the device and used to record various public IVR service numbers.

Further, a preset IVR service number may be an IVR service number that may be related to user personal information with a relatively higher secrecy requirement, for example, a bank client service number, a telecom operator service number, or a securities dealer telephone entrustment number. Moreover, the foregoing listed IVR service numbers are merely an example, and the preset IVR service number includes, but is not limited to, the listed IVR service numbers.

For example, if the called number is a preset IVR service number recorded in the foregoing public number database, the call screen may selectively use a display mode of indirect display, and hide display of the personal information entered by the user, or if the called number is not any IVR service number recorded in the foregoing public number database, the call screen may always use a display mode of direct display, and does not need to hide display of any information on the call screen.

Step S202: The device determines that a call is established to another device corresponding to the called number.

Further, after the device detects a dial operation of the user and detects that the called number is a preset IVR service number, the device further determines a call connection state between the device and the other device corresponding to the called number. After determining that the call is established between the device and the other device, the device correspondingly displays, according to the display mode of the call screen, characters entered by the user.

The foregoing another device may be an IVR server corresponding to the called number.

Optionally, after determining that the call is established to the foregoing another device, the device may first perform an operation in step S202A, that is, switch an input display area on the call screen to be in an editable state, then perform an operation in step S203, that is, determine whether the display mode of the call screen needs to be switched, or the device may directly perform an operation in step S203, that is, directly determine whether the display mode of the call screen needs to be switched.

Step S202A: The device switches an input display area on the call screen to be in an editable state.

Further, after determining that the call is established between the device and the other device corresponding to the called number, the device switches the input display area on the call screen to be in an editable state.

The editable state is a processing state in which the user can perform editing operations such as change and deletion on characters entered using a dial pad or in another method and displayed in the input display area in order to avoid a case in which error information may be entered and cannot be changed during entering by the user.

It should be noted that, an initial state of the input display area on the call screen may also be set by default to an editable state. Moreover, a specific implementation manner is not limited in this embodiment.

It should be noted that if the input display area on the call screen of the device is in an editable state, after an operation of subsequently entering characters of personal information by the user is completed, when a preset operation for sending is obtained, a complete character string composed of the characters subsequently entered by the user needs to be sent to the other device corresponding to the called number.

For example, the operation for sending may be a click operation of the user on a preset Send key in an interaction area on the call screen. In the present disclosure, the selected Send key may be any key in the interaction area that does not affect normal entering by the user, or may be a functional key that is added to the interaction area in advance. Moreover, the foregoing listed implementation manner of the operation for sending is merely an example, and the implementation manner of the operation for sending includes, but is not limited to, the foregoing listed implementation manner.

Step S203: The device determines whether a display mode of the call screen needs to be switched.

Further, after determining that the call is established between the device and the other device corresponding to the called number, the device determines, by detecting a preset user operation or detecting an input prompt of the other device for the user, whether the display mode of the call screen needs to switched currently in order to switch the display mode of the call screen to the indirect display when determining that the display mode of the call screen needs to switched currently such that display of personal information on the call screen is hidden.

In an implementation manner, determining, by the device, by detecting a preset user operation may further include determining by detecting a click operation of the user on a preset identifier in the interaction area on the call screen.

Figure 5:
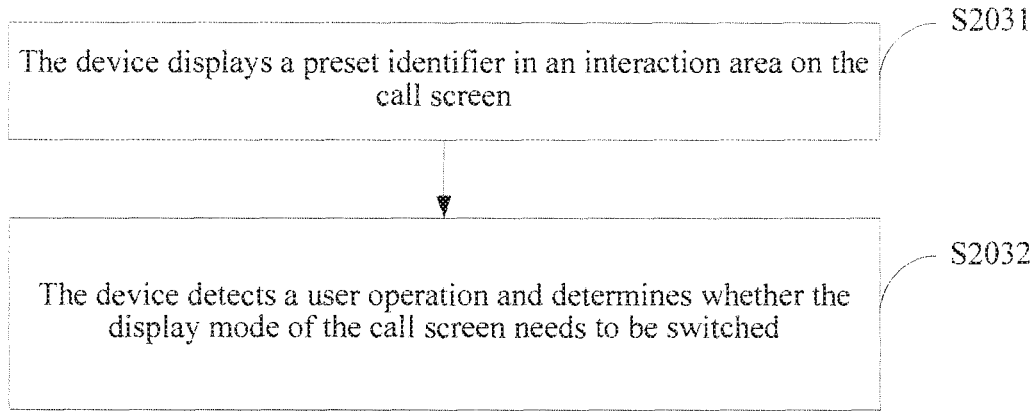
FIG. 5 is a schematic flowchart 3 of a method for hiding personal information on a call screen according to an embodiment of the present disclosure.

For example, as shown in FIG. 5, the foregoing determining operation may include the following steps.

Step S2031: The device displays a preset identifier in an interaction area on the call screen.

Further, after determining that the call is established between the device and the other device corresponding to the called number, the device displays the preset identifier in the interaction area on the call screen. The preset identifier may be a controllable key set at a preset position in the interaction area.

It should be noted that, the preset identifier may also be a controllable key that is always displayed at a preset position in the interaction area. Moreover, according to different user requirements or application scenarios, specific implementation manners of the preset identifier may be different, which is not limited herein.

Step S2032: The device detects a user operation and determines whether the display mode of the call screen needs to be switched.

Further, the device detects the user operation, and after detecting the click operation of the user on the preset identifier in the interaction area, determines that the display mode of the call screen needs to be switched currently.

It should be noted that, the foregoing manner of determining the click operation of the user on the preset identifier as a preset user operation is merely an example. In this embodiment of the present disclosure, a user interaction operation (such as a gesture, an action, or a voice) of another type may also be determined as the preset user operation. The used manner is not limited herein.

In another implementation manner, determining, by the device, by detecting an input prompt of the other device for the user may further include determining by recognition whether a voice prompt tone provided by the other device includes a preset keyword.

Figure 6:
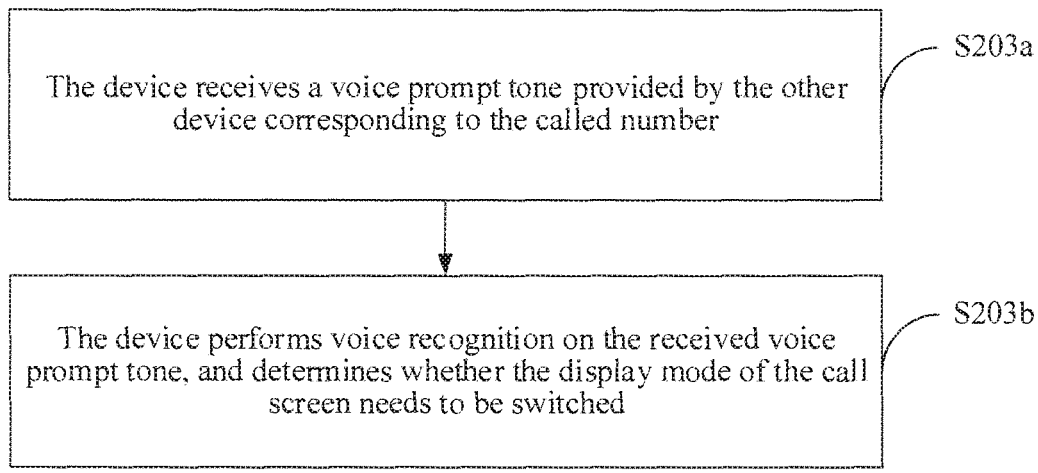
FIG. 6 is a schematic flowchart 4 of a method for hiding personal information on a call screen according to an embodiment of the present disclosure.

For example, as shown in FIG. 6, the foregoing determining operation may include the following steps.

Step S203a: The device receives a voice prompt tone provided by the other device corresponding to the called number.

Further, after determining that the call is established between the device and the other device corresponding to the called number, the device receives the voice prompt tone provided, by means of the call, by the other device corresponding to the called number.

The foregoing voice prompt tone may be a voice prerecorded by the other device and used to guide the user, and the voice includes descriptions of a provided service function and a user key function. Moreover, according to different enterprises or agencies providing an IVR service, the foregoing voice prompt tone provided by another device corresponding to each IVR service number may be different, which is not limited herein.

Step S203b: The device performs voice recognition on the received voice prompt tone, and determines whether the display mode of the call screen needs to be switched.

Further, after the device receives the voice prompt tone provided by the other device, the device performs voice recognition on the voice prompt tone, and when determining by recognition that the voice prompt tone includes the preset keyword, determines that the display mode of the call screen needs to be switched currently.

The preset keyword is a keyword pre-stored in the device and used to describe related personal information, such as "ID card number," "password," or "bank account." Moreover, the foregoing listed keywords are merely an example, and the preset keyword includes, but is not limited, the listed keywords. The user may also add a required keyword to the device according to personal requirements, for example, the user may add "stock code" as a preset keyword according to a requirement of the user for using the IVR service for securities transaction in order to ensure security of the transaction.

For example, if "ID card number" and "password" are set as preset keywords, when the voice prompt tone provided by the other device is "please enter the ID card number and end by pressing the pound key," "please enter a current password," or "please enter a password after change," it can be determined by recognition that the voice prompt tone includes the preset keyword, and further, it is determined that the display mode of the call screen needs to be switched currently.

In another implementation manner, the determining, by the device, by detecting the input prompt of the other device for the user may also include recording a character sequence that is entered by the user by means of input operations of various forms after the call is established in order to further determine according to an IVR service item corresponding to the character sequence.

Figure 7:
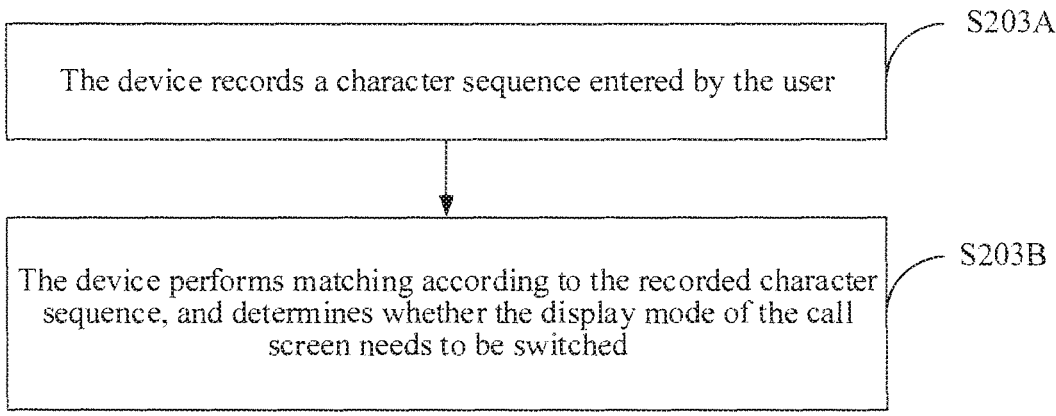
FIG. 7 is a schematic flowchart 5 of a method for hiding personal information on a call screen according to an embodiment of the present disclosure.

For example, as shown in FIG. 7, the foregoing determining operation may include the following steps.

Step S203A: The device records a character sequence entered by the user.

Further, after determining that the call is established between the device and the other device corresponding to the called number, the device records, by detecting input of the user, a character sequence corresponding to the input operation.

The detecting input of the user may be detecting the click operation of the user on the interaction area on the call screen, for example, the user enters using numbers or character keys on the dial pad, or may be detecting voice input of the user.

The character sequence entered by the user includes all characters entered by the user by means of input operations of different forms, for example, after the call is established, the user sequentially enters "1", "3", "6", and "3". Therefore, the character sequence may be determined as "1363".

Step S203B: The device performs matching according to the recorded character sequence, and determines whether the display mode of the call screen needs to be switched.

Further, after obtaining the recorded character sequence, the device matches the character sequence and a preset menu directory corresponding to the called number, and further, when determining that the IVR service item corresponding to the character sequence is an information service item, determines that the display mode of the call screen needs to be switched currently.

The preset menu directory corresponding to the called number is obtained from an IVR service provider by the device in advance and is used to describe a menu structure of a service provided by the IVR service provider corresponding to the called number. Moreover, correspondences between character sequences and IVR service items may be determined according to the preset menu directory.

An information service item is a preselected service item in which the user needs to provide personal information in a processing process, such as a transfer remittance service requiring the user to provide a bank account and an account password or a password change service requiring the user to provide the account password. For example, the preset menu directory may be shown in Table 1:

TABLE 1

| First level menu | Second level menu | Third level menu |
| --- | --- | --- |
| Press 1 for Chinese service | Press 1 for account query | ... |
| | Press 2 for transfer remittance | ... |
| | Press 3 for password change | ... |
| | Press 4 for complaints and suggestions | ... |
| | Press 5 for manual service | ... |
| | Press the star key to return to the previous level menu | ... |
| Press 2 for English service | Press 1 for account query | ... |
| | ... | ... |
| | Press the star key to return to the previous level menu | |

As shown in table 1, in a second level menu, "press 2 for transfer remittance" requiring the user to provide the bank account and "press 3 for password change" requiring the user to provide the account password may be set as information service items in advance.

Further, it should be noted that the device may store the foregoing preset menu directory in an Extensible Markup Language (XML) file form. For example, the preset menu directory shown in table 1 is converted to be in an XML file form, which may be shown as follows:

```
<?xml version="1.0"?>
  <Incoming_Call>
    <chinese>
      <press_1>Account enquiry<press_1>
      <press_2>Remittance<press_2>
      <press_3>Change Password<press_3>
      <press_4>Complaints<press_4>
      <press_5>Manual service<press_5>
      <press_6>Return<press_6>
    </chinese>
    <english>
      <press_1>...<press_1>
```

-continued

```
    <press_2>...<press_2>
    <press_3>...<press_3>
    ...
  </english>
</Incoming_Call>
```

It should be noted that the device may store the foregoing preset menu directory in an XML file form, or may implement storage in another manner, which is not limited herein. Structures that can reflect the preset menu directory should all fall within the protection scope of this embodiment of the present disclosure.

Moreover, the foregoing listed preset menu directory and an XML file format obtained by converting the preset menu directory are merely an example, and the preset menu directory and a file format include, but are not limited to, the foregoing listed preset menu directory and the XML file format. According to different IVR service providers (that is, another device corresponding to a called number is different), menu structures indicated by preset menu directories thereof and service items included therein may also be different. Moreover, according to different device settings or user requirements, XML file formats obtained by converting the preset menu directories may also be different.

For example, after recording the obtained character sequence, the device matches the obtained character sequence and the preset menu directory. It is assumed that the character sequence is "13", and then it may be determined that the IVR service item corresponding to the character sequence in the preset menu directory shown in table 1 is the password change service (the user needs to provide a current password and a new password after change), that is, the information service item. Further, it may be determined that the display mode of the call screen needs to be switched currently.

It should be noted that there are multiple types of character sequences corresponding to any information service item in the preset menu directory. For example, "13", "1*13", or "2*13" can correspond to the password change service. Moreover, as a complex degree of the preset menu directory rises (a quantity of menu levels is increased or options of menus of various levels are increased), types of character sequences that can correspond to each information service item accordingly increase.

Step S204: The device switches the display mode of the call screen to indirect display.

Further, when determining that the display mode of the call screen needs to be switched currently, the device switches the display mode of the call screen to the indirect display.

The indirect display is a display mode of replacing the characters, obtained by the device and entered by the user, with preset characters and displaying the preset characters in the input display area on the call screen.

Step S205: The device displays according to the display mode of the call screen.

Further, after determining that the current display mode of the call screen is the indirect display, the device replaces the characters, obtained by detecting the input of the user, with the preset characters, and displays the preset characters in the input display area on the call screen.

The detecting input of the user may be detecting the click operation of the user on the interaction area on the call screen, for example, the user performs key input using numbers or character keys on the dial pad, or may be detecting voice input of the user, for example, the user performs voice input using a voice recognition function of the device. Moreover, specific implementation manners may be different according to different application scenarios or user requirements and habits, which is not limited herein.

Figure 8:
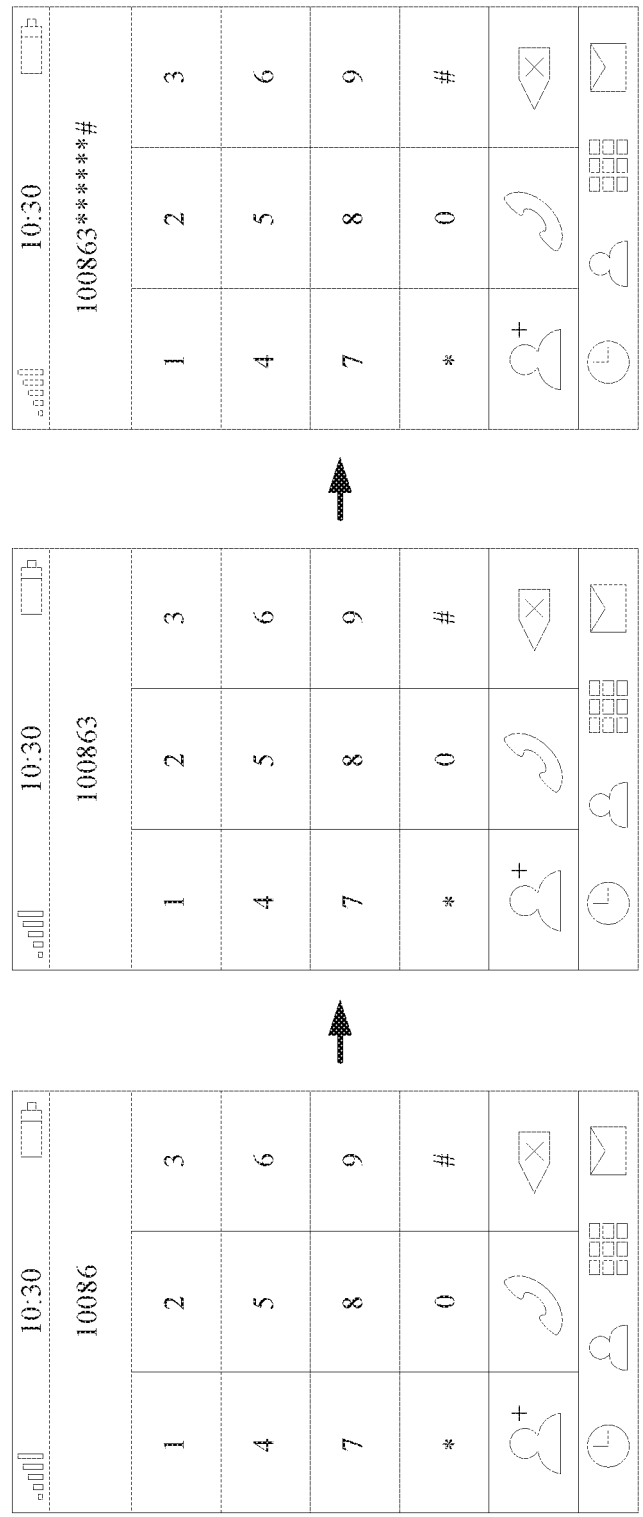
FIG. 8 is schematic effect diagram of a call screen using indirect display according to an embodiment of the present disclosure.

For example, as shown in FIG. 8, in this embodiment, the user dials a called number "10086", further selects "3" according to a voice prompt, and changes an account password. It is assumed that the device switches the display mode of the call screen to indirect display after performing the determining step, and then characters of personal information subsequently entered by the user may be replaced with "*" for display, for example, password characters "666666" entered by the user according to the voice prompt are replaced with "******" for display. Moreover, the foregoing selected preset character "*" is merely an example, and the preset character includes, but is not limited to, "*".

It should be noted that if the display mode of the call screen is the indirect display, the device may forcibly set the call screen to a mute state, that is, when the user performs a click operation on the interaction area on the call screen to enter characters, the device does not play a keypad tone.

Optionally, if the device determines, by recognizing that the voice prompt tone includes a preset keyword, that the display mode of the call screen needs to be switched currently, the device may also select a hiding policy corresponding to the preset keyword from a preset hiding template library according to the foregoing recognized preset keyword. The preset hiding template library is a database in which correspondences between preset keywords (that is, personal information types) and available hiding policies during indirect display are recorded.

The following may be further included: when the preset keyword is "ID card number", it may be determined that a corresponding hiding policy is partial hiding, that is, using preset characters to replace only the seventh to the fourteenth characters of the identity (ID) card numbers entered by the user. For example, the characters "440302198705062133" entered by the user are replaced with "440302******2133" for display. Alternatively, when the preset keyword is "password," it may be determined that a corresponding hiding policy is complete hiding, that is, using preset characters to replace all characters entered by the user. For example, characters "123456" entered by the user are replaced with "****" for display.

Moreover, the correspondences between the foregoing listed preset keywords and hiding polices, and specific replacement manners used in hiding policies are all examples, and may be different according to different actual application scenarios or user requirements, which is not limited herein.

It should be noted that if the input display area on the call screen is in an editable state, after switching the display mode of the call screen to the indirect display, the device may replace, with preset characters, the obtained characters subsequently entered by the user and display the preset characters in the input display area that is in the editable state.

Further, the device sends a complete character string composed of the characters entered by the user to the other device corresponding to the called number only when obtaining the preset operation for sending.

Using a case in which the foregoing operation for sending is a click on a Send key as an example, the user sequentially enters "1", "2", "3", "4", "5", "6", and "#" in the input display area that is in an editable state. Because the input display area is in an editable state, in a process in which the user clicks keys one by one to enter, the device may not send an entered single character to the other device, but after the user clicks the Send key, the device can send a complete character string "123456#" to the other device corresponding to the called number. Moreover, before the user clicks the Send key, the user may also perform editing operations such as change and deletion on the entered characters, thereby effectively avoiding input errors caused by operation faults.

Further, optionally, after switching the display mode of the call screen to the indirect display, the device may also switch, according to a preset user operation, the display mode of the call screen to the direct display, or when determining that the current another device does not prompt the user to enter personal information, switch the display mode of the call screen to the direct display. The following may be included.

If the device determines, by detecting the click operation of the user on the preset identifier, that the display mode of the call screen needs to be switched currently, in the display mode that is already switched to the indirect display, if the device detects the click operation of the user on the preset identifier again, the device restores the display mode of the call screen to the direct display.

Alternatively, if the device determines, by recognizing that the voice prompt tone includes a preset keyword, that the display mode of the call screen needs to be switched currently, in the display mode that is already is switched to the indirect display, after determining by detection that a voice prompt tone subsequently provided by the other device does not include any preset keyword, the device restores the display mode of the call screen to the direct display.

Alternatively, if the device determines, by determining the IVR service item corresponding to the character sequence, that the display mode of the call screen needs to be switched currently, in the display mode that is already switched to the indirect display, after determining that the IVR service item corresponding to the current character sequence is not an information service item, the device restores the display mode of the call screen to the direct display.

It should be noted that, if the display mode of the current call screen is the indirect display, when detecting the operation for restoring, the device may restore all the preset characters in the current input display area to corresponding characters for displaying, and after an interval of preset duration, replace the restored characters with the preset characters again for display.

The operation for restoring may be a touch and hold operation on the input display area, and the preset duration is display duration that is set by a system by default or externally set by a user. When performing the touch and hold operation on the input display area, the user may enable the characters that are displayed as the preset characters in the input display area to be restored to corresponding real characters during the preset duration for display such that the user learns a case of the entered characters. Moreover, when the input display area is in an editable state, modification operations such as addition and deletion on the entered characters may also be implemented, thereby effectively avoiding input errors caused by operation faults.

Moreover, using the foregoing touch and hold operation on the input display area as a setting manner of the operation for restoring is merely an example, and the setting manner includes, but is not limited to, the touch and hold operation. The preset duration may be relatively short duration or may be relative long duration, and starts when the operation for restoring is detected, and ends until the user performs subsequent input.

This embodiment of the present disclosure provides a method for hiding personal information on a call screen. After establishing a call to another device, the device first obtains by detection characters entered by a user, and further, when determining that a display mode of a call screen is indirect display, replaces the obtained characters with preset characters and displays the characters in an input display area. In this way, when the user enters personal information, the entered information on the call screen is hidden by replacement in order to avoid a problem of a high security risk of an IVR service that is caused using plaintext to display information. Therefore, the present disclosure can optimize security of the IVR service, and improve availability of the IVR service.

Figure 9:
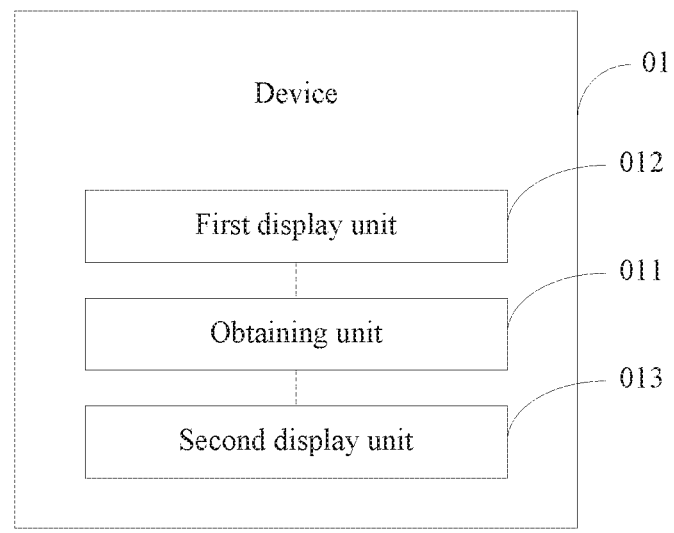
FIG. 9 is a schematic structural diagram 1 of a device according to an embodiment of the present disclosure.

As shown in FIG. 9, an embodiment of the present disclosure provides a device 01, where the device 01 is configured to implement the method for hiding personal information on a call screen provided by the embodiment of the present disclosure, and may be the device 001 shown in FIG. 1 or may be a functional module in the device 001. As shown in FIG. 9, the device 01 includes an obtaining unit 011 configured to detect user input and obtain characters entered by a user after the device 01 establishes a call to another device, a first display unit 012 configured to replace the obtained characters with preset characters and display the preset characters in an input display area on the call screen if a display mode of the call screen is indirect display, and a second display unit 013 configured to directly display the obtained characters in the input display area if the display mode is direct display.

It should be noted that a dashed line connection indicates that a connection relationship may exist between units or a direct connection relationship may not exist between units, for example, the obtaining unit 011 and the first display unit 012 may not have information exchange. The obtaining unit 011 may notify the first display unit 012 after obtaining the characters entered by the user, or may not notify the first display unit 012, and the device 01 performs unified regulation.

Figure 10:
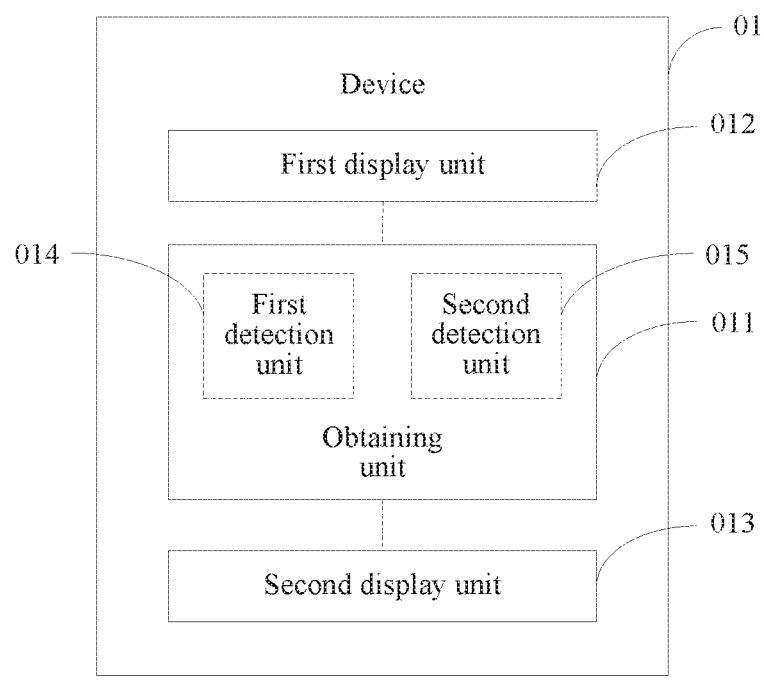
FIG. 10 is a schematic structural diagram 2 of a device according to an embodiment of the present disclosure.

Optionally, as shown in FIG. 10, the obtaining unit 011 may further include a first detection unit 014 or a second detection unit 015, where the first detection unit 014 is configured to detect a click operation of the user in an interaction area on the call screen after the device 01 establishes the call to the other device, and the second detection unit 015 is configured to detect voice input of the user after the device 01 establishes the call to the other device. Further, a dashed line box indicates that the unit may be included or may not be included in the device.

Figure 11:
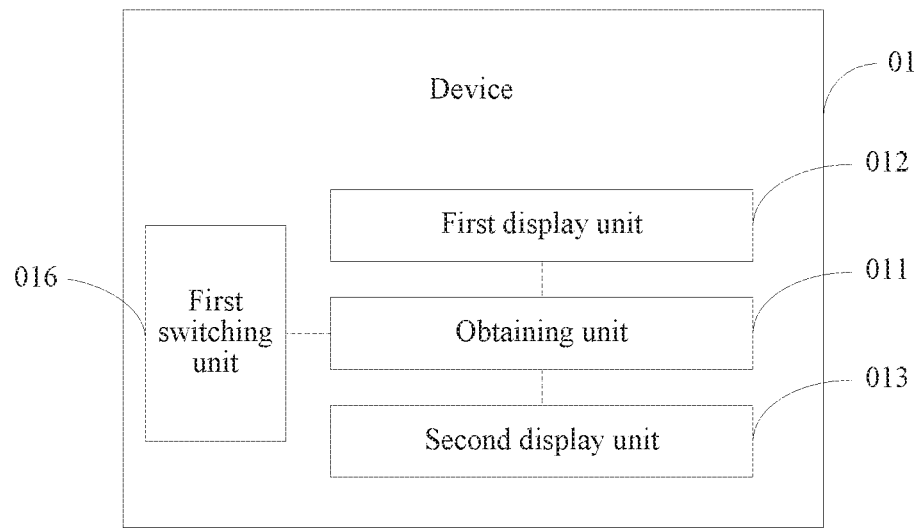
FIG. 11 is a schematic structural diagram 3 of a device according to an embodiment of the present disclosure.

Optionally, as shown in FIG. 11, the device 01 may further include a first switching unit 016 configured to switch the display mode after detecting a click operation of the user on a preset identifier in the interaction area on the call screen.

Figure 12:
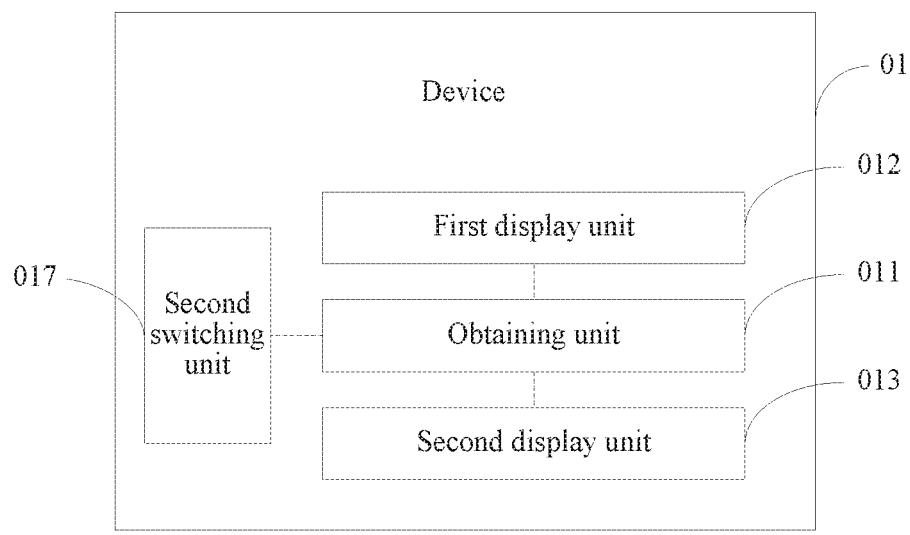
FIG. 12 is a schematic structural diagram 4 of a device according to an embodiment of the present disclosure.

Optionally, as shown in FIG. 12, the device 01 may further include a second switching unit 017 configured to switch the display mode to the indirect display when detecting that the other device prompts the user to enter personal information after the device 01 establishes the call to the other device, if the display mode is the direct display.

Optionally, the second switching unit 017 may be further configured to receive a voice prompt tone provided by the other device and perform voice recognition on the voice prompt tone, and switch the display mode to the indirect display when determining by recognition that the voice prompt tone includes a preset keyword.

Optionally, the second switching unit 017 may be further configured to record a character sequence entered by the user and match the character sequence and a preset menu directory, where the preset menu directory is a data table in which a correspondence between at least one character sequence and a service item is recorded, and switch the display mode to the indirect display when determining that a service item corresponding to the character sequence is an information service item, where the information service item is a service item in which personal information needs to be provided to the other device.

Optionally, when the input display area is in an editable state, the first display unit 012 may be further configured to replace the obtained characters with the preset characters and display the preset characters in the input display area that is in an editable state, and send a character string composed of the obtained characters to the other device after detecting an operation for sending.

Figure 13:
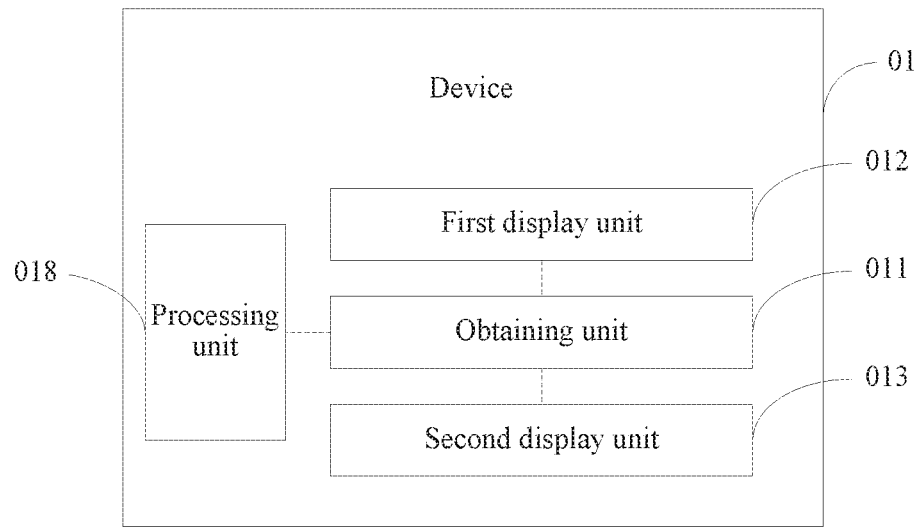
FIG. 13 is a schematic structural diagram 5 of a device according to an embodiment of the present disclosure.

Optionally, as shown in FIG. 13, the device 01 may further include a processing unit 018 configured to restore all the preset characters in the input display area to corresponding characters for display after the device 01 establishes the call to the other device, if the display mode is the indirect display, when detecting an operation for restoring, and replace the restored characters with the preset characters for display after an interval of preset duration.

This embodiment of the present disclosure provides the device 01. After establishing a call to another device, the device 01 obtains by detection characters entered by a user, and further, when determining that a display mode of a call screen is indirect display, replaces the obtained characters with preset characters and displays the characters in an input display area. In this way, when the user enters personal information, the entered information on the call screen is hidden by replacement in order to avoid a problem of a high security risk of an IVR service that is caused using plaintext to display information, optimize security of the IVR service, and improve availability of the IVR service.

Figure 14:
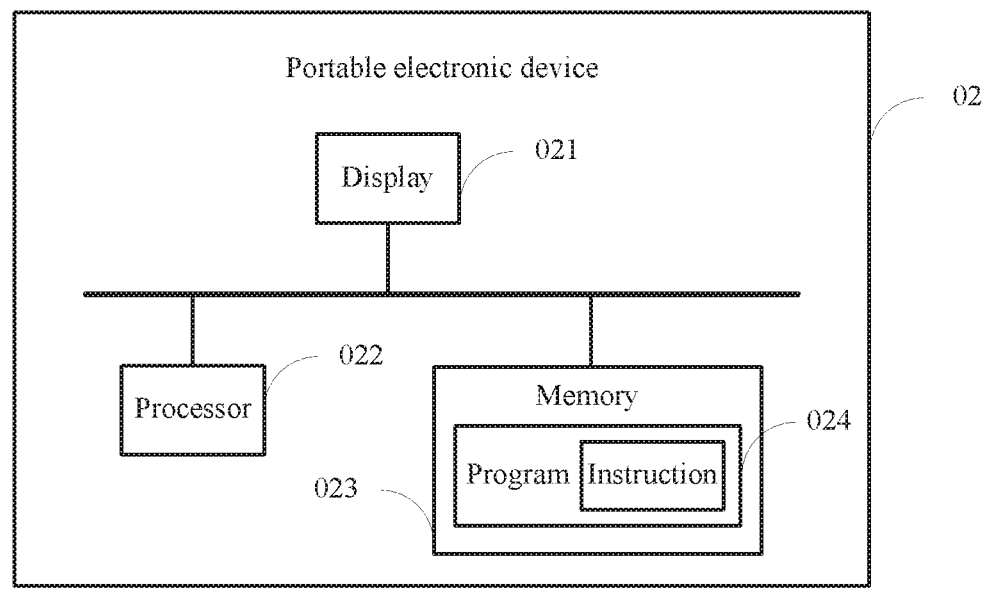
FIG. 14 is a schematic structural diagram of a portable electronic device according to an embodiment of the present disclosure.

As shown in FIG. 14, an embodiment of the present disclosure provides a portable electronic device 02 configured to implement the method for hiding personal information on a call screen provided by the embodiment of the present disclosure, which may be the device 001 shown in FIG. 1 or a functional module in the device 001. As shown in FIG. 14, the portable electronic device 02 includes a display 021, where the display 021 includes a touch-sensitive surface and a display screen, one or more processors (designated as a processor) 022, a memory 023, and one or more programs (designated as a program) 024, where the program 024 is stored in the memory 023 and are configured to be executed by the processor 022, and the program 024 include an instruction, where the instruction is used to obtain, after the portable electronic device 02 establishes a call to another device, characters entered by a user, replace the obtained characters with preset characters and display the preset characters in an input display area on the call screen if a display mode of the call screen is indirect display, and directly display the obtained characters in the input display area if the display mode is direct display.

Optionally, obtaining, after the portable electronic device 02 establishes a call to another device, characters entered by a user may include obtaining, by detecting a click operation of the user in an interaction area on the call screen, the characters entered by the user after the portable electronic device 02 establishes the call to the other device, or obtaining, by detecting voice input of the user, the characters entered by the user after establishing the call to the other device.

Optionally, the foregoing instruction may be further used to switch the display mode after detecting a click operation of the user on a preset identifier in the interaction area on the call screen.

Optionally, the foregoing instruction may be further used to switch the display mode to the indirect display when detecting that the other device prompts the user to enter personal information after the portable electronic device 02 establishes the call to the other device, if the display mode is the direct display.

Optionally, switching the display mode to the indirect display when detecting that the other device prompts the user to enter personal information may include receive a voice prompt tone provided by the other device and perform voice recognition on the voice prompt tone, and switch the display mode to the indirect display when determining by recognition that the voice prompt tone includes a preset keyword.

Optionally, switching the display mode to the indirect display when detecting that the other device prompts the user to enter personal information may include record a character sequence entered by the user and match the character sequence and a preset menu directory, where the preset menu directory is a data table in which a correspondence between at least one character sequence and a service item is recorded, and switch the display mode to the indirect display when determining that a service item corresponding to the character sequence is an information service item, where the information service item is a service item in which personal information needs to be provided to the other device.

Optionally, the foregoing instruction may be further used to replace the obtained characters with the preset characters and display the preset characters in the input display area that is in an editable state when the input display area is in an editable state, and send a character string composed of the obtained characters to the other device after detecting an operation for sending.

Optionally, the foregoing instruction may be further used to restore all the preset characters in the input display area to corresponding characters for display after the portable electronic device 02 establishes the call to the other device, if the display mode is the indirect display, when detecting an operation for restoring, and replace the restored characters with the preset characters for display after an interval of preset duration.

This embodiment of the present disclosure provides the portable electronic device 02. After establishing a call to another device, the portable electronic device 02 obtains by detection characters entered by a user, and further, replaces the obtained characters with preset characters and displays the characters in an input display area when determining that a display mode of a call screen is indirect display. In this way, when the user enters personal information, the entered information on the call screen is hidden by replacement in order to avoid a problem of a high security risk of an IVR service that is caused using plaintext to display information, optimize security of the IVR service, and improve availability of the IVR service.

In the several embodiments provided in this application, it should be understood that the disclosed system, device, and method may be implemented in other manners. For example, the described device embodiment is merely an example. For example, the unit division is merely logical function division and may be other division in actual implementation. For example, a plurality of units or components may be combined or integrated into another system, or some features may be ignored or not performed.

In addition, functional units in the devices and the systems in the embodiments of the present disclosure may be integrated into one processing unit, or each of the units may exist alone physically, or two or more units are integrated into one unit. The unit may be implemented in a form of hardware, or may be implemented in a form of hardware in addition to a software functional unit.

All or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for hiding personal information on a call screen of a device, comprising:
   detecting user mode selection input;
   in response to the mode selection input, switching an input display area on the call screen between a direct display mode and an indirect display mode;
   obtaining characters entered by the user after establishing a call to another device;
   switching the display mode to the indirect display mode when detecting that the other device prompts the user to enter personal information and when the display mode is the direct display mode, wherein switching the display mode to the indirect display mode comprises;
   recording a character sequence entered by the user;
   matching the character sequence and a preset menu directory, wherein the preset menu directory is a data table in which a correspondence between at least one character sequence and a service item is recorded;
   replacing the obtained characters with preset characters;
   displaying the preset characters in the input display area when the display mode is indirect display; and
   displaying the obtained characters in the input display area when the display mode is direct display.

2. The method according to claim 1, wherein obtaining the characters entered by the user comprises:
   obtaining, by detecting a click operation of the user in an interaction area on the call screen, the characters entered by the user after establishing the call to the other device; or
   obtaining, by detecting voice input of the user, the characters entered by the user after establishing the call to the other device.

3. The method according to claim 1, wherein detecting user mode selection input further comprises detecting a click operation of the user on a preset mode identifier in an interaction area on the call screen.

4. The method according to claim 1, wherein switching the display mode to the indirect display comprises:
   receiving a voice prompt tone provided by the other device; performing voice recognition on the voice prompt tone; and
   switching the display mode to the indirect display when the voice prompt tone comprises a preset keyword.

5. The method according to claim 1, wherein switching the display mode to the indirect display further comprises switching the display mode to the indirect display when a service item corresponding to the character sequence is an information service item, wherein the information service item is a service item in which the personal information needs to be provided to the other device.

6. The method according to claim 1, wherein when the input display area is in an editable state, replacing the obtained characters with the preset characters and displaying the preset characters comprises:
   replacing the obtained characters with the preset characters;
   displaying the preset characters in the input display area in the editable state; and
   sending a character string composed of the obtained characters to the other device after detecting an operation for sending.

7. The method according to claim 1, wherein after establishing the call to the other device, the method further comprises:
   restoring all the preset characters in the input display area to corresponding characters for display when the display mode is the indirect display, and when detecting an operation for restoring; and
   replacing the restored characters with the preset characters for display after an interval of preset duration.

8. The method according to claim 1, wherein detecting user mode selection input further comprises detecting a voice input activating a preset mode identifier.

9. A portable electronic device, comprising:
   a display comprising:
     a touch-sensitive surface; and
     a display screen coupled to the touch-sensitive surface;
   one or more processors coupled to the display; and
   a memory coupled to the one or more processors and configured to store one or more programs comprising an instruction, wherein the one or more programs are configured to be executed by the one or more processors, and
   wherein when executed, the instruction causes the one or more processors to be configured to:
     responsive to user mode selection input, switch an input display area on the display screen between a direct display mode and an indirect display mode;
     obtain characters entered by a user with the touch-sensitive surface after the portable electronic device establishes a call to another device;
     switch the display mode to the indirect display mode when detecting that the other device prompts the user to enter personal information after the portable electronic device establishes the call to the other device, and when the display mode is the direct display made, wherein switching the display mode to the indirect display mode further comprises;
     recording a character sequence entered by the user; and
     matching the character sequence and a preset menu directory, wherein the preset menu directory is a data table in which a correspondence between at least one character sequence and a service item is recorded;

replace the obtained characters with preset characters;

display the preset characters in the input display area when a display mode of the display screen is indirect display; and directly display the obtained characters in the input display area when the display mode is direct display.

10. The portable electronic device according to claim 9, wherein when obtaining the characters entered by the user, the instruction further causes the one or more processors to be configured to:

obtain, by detecting a click operation of the user in an interaction area on the display screen, the characters entered by the user after the portable electronic device establishes the call to the other device; or obtain, by detecting voice input of the user, the characters entered by the user after the portable electronic device establishes the call to the other device.

11. The portable electronic device according to claim 9, wherein the instruction further causes the one or more processors to be configured to switch the display mode in response to detecting a click operation of the user on a preset mode identifier in an interaction area on the display screen.

12. The portable electronic device according to claim 9, wherein when switching the display mode to the indirect display, the instruction further causes the one or more processors to be configured to:

receive a voice prompt tone provided by the other device;

perform voice recognition on the voice prompt tone; and switch the display mode to the indirect display when the voice prompt tone comprises a preset keyword.

13. The portable electronic device according to claim 9, wherein when switching the display mode to the indirect display, the instruction further causes the one or more processors to be configured to switch the display mode to the indirect display when a service item corresponding to the character sequence is an information service item, wherein the information service item is a service item in which the personal information needs to be provided to the other device.

14. The portable electronic device according to claim 9, wherein the instruction further causes the one or more processors to be configured to:

replace the obtained characters with the preset characters;

display the preset characters in the input display area when the input display area is in an editable state; and send a character string composed of the obtained characters to the other device after detecting an operation for sending.

15. The portable electronic device according to claim 9, wherein the instruction further causes the one or more processors to be configured to:

restore all the preset characters in the input display area to corresponding characters for display after the portable electronic device establishes the call to the other device, when the display mode is the indirect display, and when detecting an operation for restoring; and replace the restored characters with the preset characters for display after an interval of preset duration.

16. The portable electronic device according to claim 9, wherein user mode selection input further comprises voice input.

17. A non-transitory computer readable storage medium storing one or more programs, wherein the one or more programs comprise an instruction, wherein when executed by a portable electronic device, the instruction enables the portable electronic device to implement the operations of:

responsive to user mode selection input, switching an input display area on a call screen between a direct display mode and an indirect display mode;

obtaining characters entered by a user after establishing a call to another device;

switching the display mode to the indirect display mode when detecting that the other device prompts the user to enter personal information, and when the display mode is the direct display mode, wherein switching the display mode to the indirect display mode comprises:

recording a character sequence entered by the user;

matching the character sequence and a preset menu directory, wherein the preset menu directory is a data table in which a correspondence between at least one character sequence and a service item is recorded;

replacing the obtained characters with preset characters;

displaying the preset characters in the input display area when a display mode is indirect display; and directly displaying the obtained characters in the input display area when the display mode is direct display.

18. The non-transitory computer readable medium according to claim 17, wherein obtaining the characters entered by the user comprises:

obtaining, by detecting a click operation of the user in an interaction area on the call screen, the characters entered by the user after establishing the call to the other device; or obtaining, by detecting voice input of the user, the characters entered by the user after establishing the call to the other device.

19. The non-transitory computer readable medium according to claim 17, wherein the operations further comprise switching the display mode in response to detecting a click operation of the user on a preset mode identifier in an interaction area on the call screen.

20. The non-transitory computer readable medium according to claim 17, wherein user mode selection input further comprises voice input.

* * * * *

UNITED STATES PATENT AND TRADEMARK OFFICE
CERTIFICATE OF CORRECTION

PATENT NO. : 10,572,693 B2
APPLICATION NO. : 15/549048
DATED : February 25, 2020
INVENTOR(S) : Yajun Zhang It is certified that error appears in the above-identified patent and that said Letters Patent is hereby corrected as shown below:

In the Claims

Claim 9, Column 20, Line 64:
"further comprises;" should read "further comprises:"

Signed and Sealed this
Twelfth Day of May, 2020

Andrei Iancu
*Director of the United States Patent and Trademark Office*